(12) United States Patent
Huang

(10) Patent No.: US 7,629,923 B2
(45) Date of Patent: Dec. 8, 2009

(54) METHOD AND DEVICE FOR STORING ECONOMICALLY AUXILIARY CORRECTION DATA APPLIED IN GLOBAL NAVIGATION SATELLITE SYSTEM

(75) Inventor: Kung-Shuan Huang, Changhua County (TW)

(73) Assignee: Media Tek Inc., Hsin-Chu Hsien (TW)

( * ) Notice: Subject to any disclaimer, the term of this patent is extended or adjusted under 35 U.S.C. 154(b) by 45 days.

(21) Appl. No.: 11/308,244

(22) Filed: Mar. 14, 2006

(65) Prior Publication Data

US 2007/0216574 A1 Sep. 20, 2007

(51) Int. Cl.
*G01S 1/00* (2006.01)
*H04W 24/00* (2006.01)

(52) U.S. Cl. .................... 342/357.02; 455/457
(58) Field of Classification Search ...... 342/357.01–17, 342/357.02; 455/457
See application file for complete search history.

(56) References Cited

U.S. PATENT DOCUMENTS

| 6,377,209 | B1 | 4/2002 | Krasner | |
| 6,552,680 | B1 * | 4/2003 | Barber et al. | 342/357.02 |
| 6,646,594 | B1 * | 11/2003 | Barber et al. | 342/357.02 |
| 6,820,132 | B1 | 11/2004 | Puente et al. | |
| 7,031,730 | B1 * | 4/2006 | Barber et al. | 455/457 |
| 7,110,883 | B1 * | 9/2006 | Pemble et al. | 701/214 |
| 2002/0082774 | A1 * | 6/2002 | Bloebaum | 701/213 |
| 2003/0201932 | A1 * | 10/2003 | Rabinowitz et al. | 342/357.09 |
| 2004/0263386 | A1 | 12/2004 | King | |
| 2006/0047413 | A1 * | 3/2006 | Lopez et al. | 701/200 |
| 2007/0241957 | A1 * | 10/2007 | Murphy | 342/357.02 |

FOREIGN PATENT DOCUMENTS

| TW | 497037 | 8/2002 |
| TW | 200516271 | 5/2005 |

* cited by examiner

*Primary Examiner*—Thomas H Tarcza
*Assistant Examiner*—Harry Liu
(74) *Attorney, Agent, or Firm*—Winston Hsu

(57) ABSTRACT

A method applied in a Global Navigation Satellite System (GNSS) for minimizing storage of correction data is disclosed. The method comprises: determining the receiver position and satellite positions; determining a intermediate point according to the receiver position and the satellite position; determining a current cell of the intermediate point; and storing the correction data sets related to the current cell.

17 Claims, 6 Drawing Sheets

METHOD AND DEVICE FOR STORING ECONOMICALLY AUXILIARY CORRECTION DATA APPLIED IN GLOBAL NAVIGATION SATELLITE SYSTEM

BACKGROUND

The present invention relates to method and device and for economically storing auxiliary correction data for positioning a Global Navigation Satellite System (GNSS) receiver, and more particularly, to method and device for economically storing Spaced Based Augmentation System (SBAS) correction data in a GNSS receiver.

Recently, the GNSS is well known in the art and are commonly used to determine the geodetic latitude and longitude coordinates of mobile vehicles employing such devices. The current GNSS includes Global Position System (GPS), Galileo, GLONASS and other satellite positioning technologies. For simplicity, a GPS device will be discussed herein as an example of a GNSS, wherein the terms "GNSS" and "GPS" may be used interchangeably.

The GPS has become one of the more popular navigation systems in the world, and as such is currently applied in a wide variety of fields. The GPS Operational Constellation consists of a plurality of satellites that orbit the earth and constantly broadcast its location information from space. GPS receivers can detect these signals and convert these signals into position, velocity, and time markers. Generally, at least three satellites are required for a GPS receiver to compute a two dimensional position (Latitude, Longitude) of the GPS receiver, with more satellites required for computing a three dimensional position (Latitude, Longitude, Height). A GPS receiver can determine its position by determining its distance from the GPS satellites according to the received signals and can calculate its location within 10 meters of accuracy.

However impressive, the current GPS system still possesses some limitations due to various potential errors. For example, the ionospheric and tropospheric disturbances can cause a delay of GPS satellite signals and thereby cause signal carriers and codes received by the GPS receiver to become distorted. Since these ionospheric and tropospheric disturbances are unpredictable and can change significantly from location to location and time to time, these errors are difficult to correct with current GPS receiver technologies. In order to solve this problem, SBAS have been developed to further account for the above-described errors and better improve the accuracy, availability and integrity of the GPS. The current SBAS includes Wide Area Augmentation System (WAAS), European Geostationary Navigation Overlay Service (EGNOS), MSAS, etc. For simplicity, a WAAS will be discussed herein as an example of a SBAS, wherein the terms "SBAS" and "WAAS" may be used interchangeably.

WAAS was developed to improve the accuracy, availability and integrity of GPS. The WAAS is based on a network consisting of a multitude of wide area ground reference stations (WRS). Each WRS can receive and analyze signals from GPS satellites within its coverage area and determine relative errors in the signals. A wide area master station (WMS) then collects the error data from each WRS and computes correction information for each GPS satellite based on specific correction algorithms. Correction messages are then uplinked to WAAS satellites, which broadcast these correction messages on the same frequency to the GPS receivers within the coverage area of the WAAS satellites. GPS receivers can then utilize the WAAS correction information to correct for GPS satellite signals errors caused by timing and distance inaccuracies, or errors caused by ionospheric disturbances.

Typically, the WAAS satellites broadcast three major types of correction data: fast correction data, long term satellite error correction data and ionospheric delay correction data. For the fast correction data and long term satellite error correction data (called fast/long term correction data hereinafter), correction data for maximum 51 satellites can provided by a WAAS satellite. Therefore, some GPS receivers prepare 51 memory spaces for storing those fast/long term correction data. The method is easy but very space consuming. One much space efficient method is only to collect and store correction data for those satellites that are currently in tracking channels. The maximum number of memory spaces required by a GPS receiver depends on the amount of tracking channels it can afford. For example, a 14-channel GPS receiver can simultaneously track up to fourteen GPS satellites and only store the fast/long term correction data corresponding to these fourteen GPS satellites from a WAAS system. The GPS receiver can then calculate and correct the positional information that is provided from the GPS satellites according to the stored fast/long-term correction data. However, the current method for storing fast/long term correction data corresponding to the tracked satellites forces the GPS receivers to wait for collecting WAAS correction data. One dilemma that may occur is when a new satellite is introduced into a tracking channel of a GPS receiver. Because the GPS receiver would not contain the fast/long term correction data for the new satellite, it must spend an extra period of time to wait for and receive new fast/long term correction data for the new GPS satellite from the WAAS satellite. The resulting delay inhibits WAAS functionality and prevents continuous and smooth operation of the GPS receiver.

Additionally, ionospheric delay correction data is broadcasted for selected ionospheric grid points (IGP) spaced at approximately 5 degree intervals in latitude and longitude. Please refer to FIG. 1. FIG. 1 is global map that illustrates the global ionospheric grid point (IGP) correction locations according to the related art. As shown in FIG. 1, there are 1808 IGPs defined around the surface of the earth horizontally distributed into nine areas (bands). One method of storing ionospheric delay correction data is to store all of the available correction data of the 1808 IGPs within the GPS receiver. Since most GPS receivers have limited memory and processing capabilities, they cannot quickly and efficiently store and process data from all the 1808 ionospheric grid points. Even if a GPS receiver does have sufficient memory capacity to store all the ionospheric grid point correction data, it would be inefficient to do so because only the localized ionospheric grid points near the GPS receiver are relevant to the ionospheric conditions at that location.

SUMMARY

Therefore, it is one of the objectives of the present invention to provide improved methods and apparatuses for storing SBAS correcting data more efficiently in a GNSS receiver, to solve the above-mentioned problem.

According to an embodiment of the present invention, a method applied in a Global Navigation Satellite System (GNSS) for minimizing storage of correction data is disclosed. The method comprises: determining a receiver position and a satellite position; determining a intermediate point according to the receiver position and the satellite position; determining a current cell of the intermediate point; and storing the correction data sets related to the current cell.

In this present invention, the GPS receiver not only in advance stores the fast/long term correction data for those satellites that are very likely to be visible, but also stores the ionospheric correction delay data of the IGPs for next cell where the IPP is moving forward. This benefits the GPS receiver for wasting no time on waiting for the fast/long term correction data of these new GPS satellites, and the new ionospheric correction delay data for new IGPs, to proceed the correcting calculation. Moreover, in contrast to the related art of storing the WAAS correction data in the GPS receiver, the storing method of this present invention greatly reduce the required capacity of the WAAS correction database. Therefore, the storing method in the present invention improves the GPS receiver to make the WAAS correction more feasible and reliable, and greatly reduces the cost and capacity of the memory in the GPS receiver.

These and other objectives of the present invention will no doubt become obvious to those of ordinary skill in the art after reading the following detailed description of the preferred embodiment that is illustrated in the various figures and drawings.

DETAILED DESCRIPTION

For simplicity, a GPS receiver will be discussed herein as an example of a GNSS receiver, wherein the terms "GNSS" and "GPS" may be used interchangeably. Similarly, the term "SBAS" and "WAAS" may be used interchangeably. However, it will be understood by one skilled in the art that the present invention is not restricted to a GPS device and may be applicable to other GNSS-type devices according to the spirit and scope of the present invention.

Figure 1:
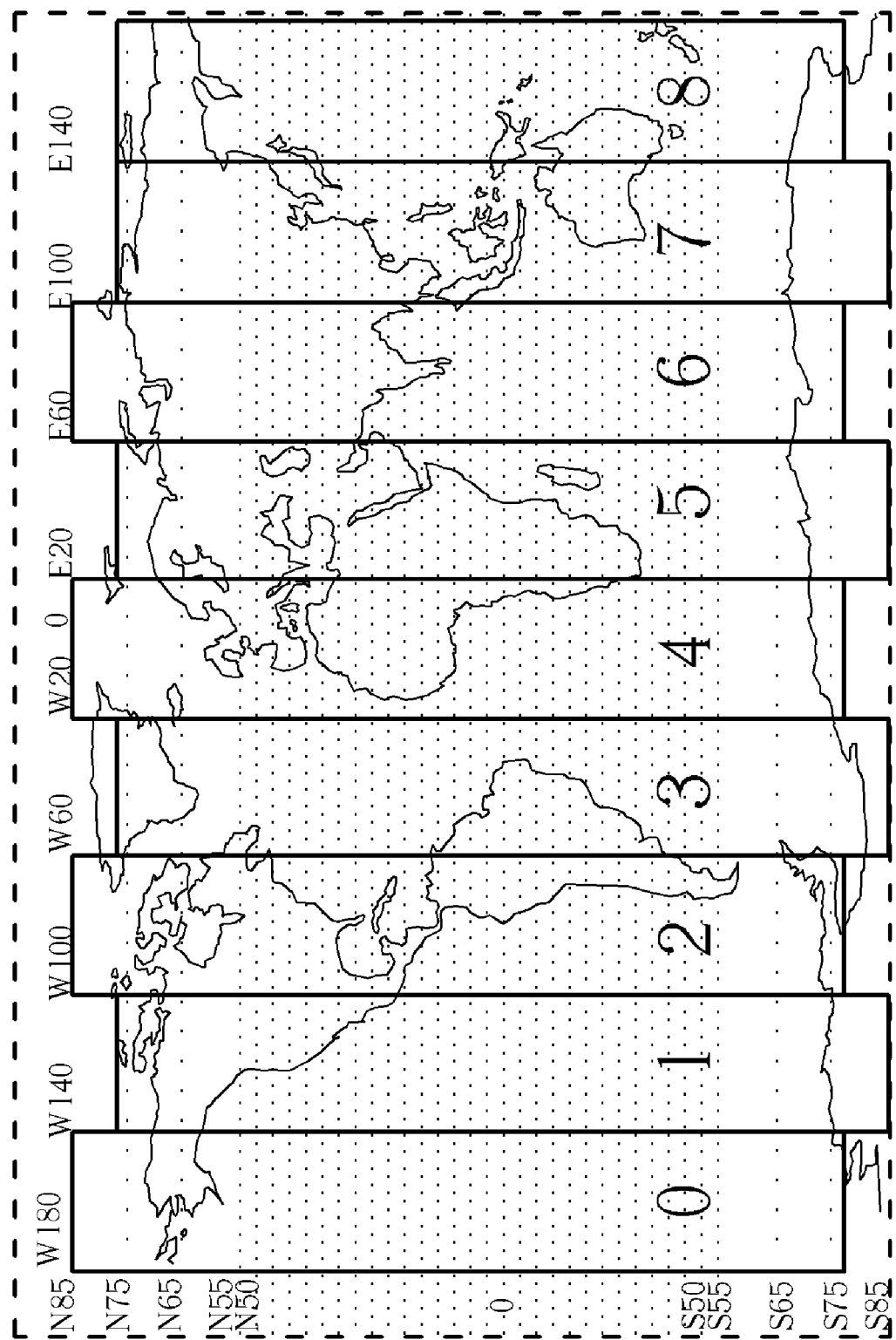
FIG. 1 is a map illustrating the global ionospheric grid point correction locations according to the related art.
Figure 2:
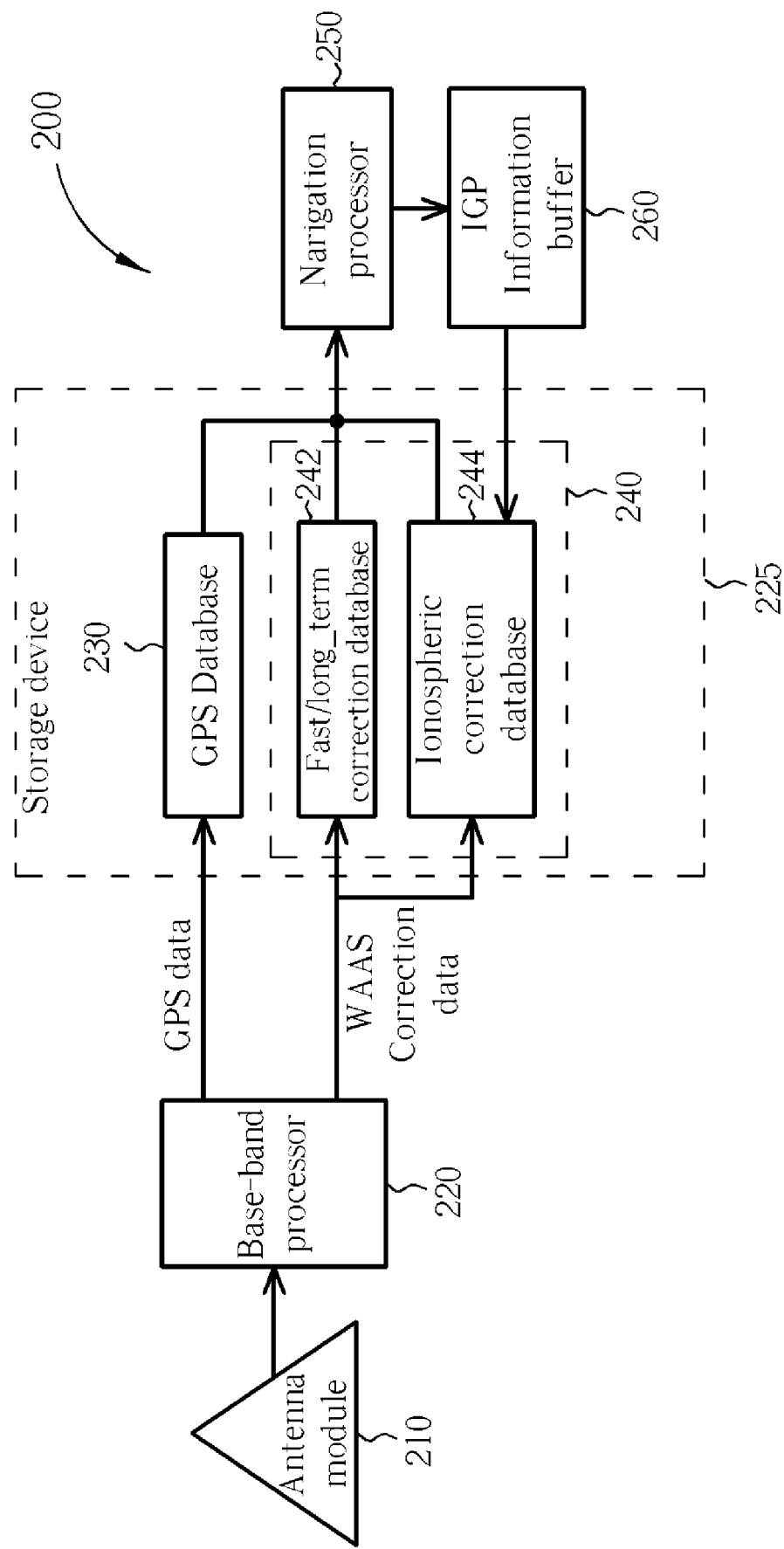
FIG. 2 is a block diagram of a GPS receiver according to an embodiment of the present invention.

Please refer to FIG. 2. FIG. 2 shows a block diagram of a GPS receiver 200 according to an embodiment of the present invention. The GPS receiver 200 includes an antenna module 210, a base-band processor 220, a storage device 225 storing a GPS database 230 and a WMS correction database 240, a navigation processor 250, and an IGP information buffer 260. The WAAS correction database 240 further includes a fast/long-term correction database 242 and an ionospheric correction database 244. The antenna module 210 tracks and scans the radio frequency (RF) signals broadcasted by GPS and WAAS satellites. The base-band processor 220 processes these RF signals and outputs the desired GPS navigation data and WAAS correction data, and then respectively stores the GPS navigation data and the WAAS correction data into the GPS database 230 and the WAAS correction database 240. The navigation processor 250 can then calculate its position information according to the GPS navigation data stored in the GPS database 230 and correct the position information according to the WAAS correction data stored in the WAAS correction database 240. Please note that, the above-mentioned position determining process of the GPS receiver 200 is considered well known in the pertinent art, detailed description is omitted for the sake of brevity.

Figure 3:
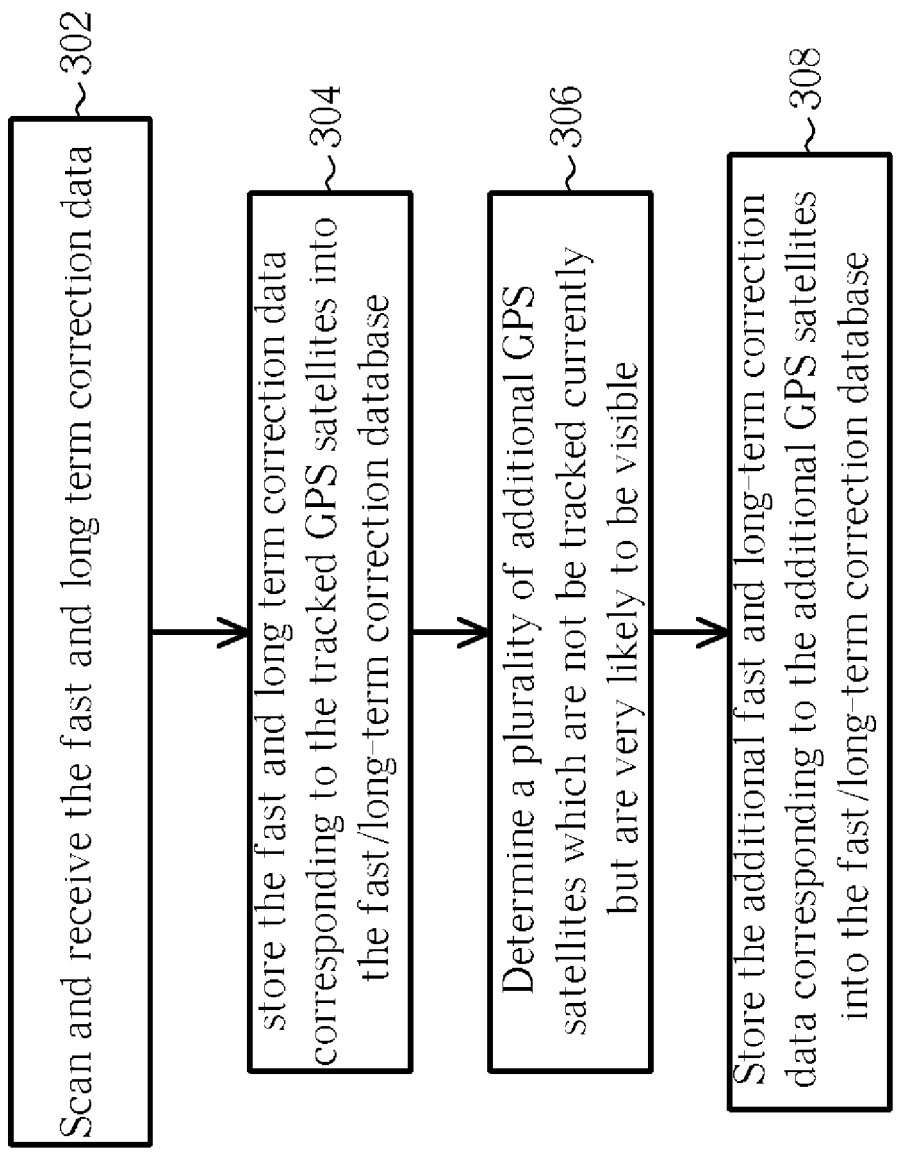
FIG. 3 is a flowchart illustrating the detailed operation for storing fast/ long-term correction data according to a first data storing method of the present invention.

Please refer to FIG. 2 in conjunction with FIG. 3. FIG. 3 is a flowchart illustrating the detailed operation for storing the fast/long-term correction data according to a first data storing method of the present invention. As previously illustrated in FIG. 2, the WAAS correction database 240 includes a fast/long-term correction database 242 and an ionospheric correction database 244. Provided that substantially the same result is achieved, the steps of the FIG. 3 need not be in the exact order shown and need not be contiguous, that is, other steps can be intermediate.

Step 302: The antenna module 210 scans and receives the fast/long term correction data.

Step 304: The base-band processor 220 stores the fast/long term correction data corresponding to the tracked GPS satellites into the fast/long-term correction database 242.

Step 306: The navigation processor 250 determines a plurality of additional GPS satellites that are not currently tracked by the GPS receiver 200 but are very likely to be visible.

Step 308: The base-band processor 220 stores the additional fast/long-term correction data corresponding to the additional GPS satellites into the fast/long-term correction database 242.

As shown by step 302 in FIG. 3, the antenna module 210 of the GPS receiver 200 receives the fast/long term correction data from WAAS satellites. The base-band processor 220 then stores the fast/long term correction data corresponding to the tracked GPS satellites into the fast/long term correction database 242 (step 304). The navigation processor 250 of the GPS receiver 200 can then correct and improve the position solution by means of the fast/long term correction data corresponding to the tracked GPS satellites. An example of this step consists of a 14-channel GPS receiver that can simultaneously track 14 GPS satellites and compute its location according to information given by and fast/long term correction data stored for the 14 GPS satellites.

As previously described, a conventional GPS receiver of the related art only stores fast/long term correction data corresponding to currently tracked satellites. When a new satellite, whose the corresponding fast/long term correction data are not stored in the conventional GPS receiver before, is allocated into one tracking channel of the conventional GPS receiver, it is necessary to spend an extra period of time waiting for receiving new fast/long term correction data corresponding to the newly tracked GPS satellite from the WAAS satellite. Thus, in this embodiment of the present invention, the navigation processor 250 can in advance determine a plurality of additional GPS satellites that are not tracked by the GPS receiver 200 currently but may be tracked by the GPS receiver 200 in the near future (step 306).

There are varieties of manners to determine the additional GPS satellites. For example, in some exemplary embodiments, a satellite with a low elevation may have its transmission blocked by buildings, trees or mountains. A GPS receiver 200 may therefore not capable of acquiring the satellite at that specific moment. The navigation processor 250 of the GPS receiver 200 can predict such a blocked satellite and store the fast/long term correction data of the blocked GPS satellite into the fast/long term correction database 242 in advance (step 308). When the blocked GPS satellites have risen to a higher elevation and are acquired by the GPS receiver 200, the GPS receiver 200 can then quickly perform the correcting process using the previously stored fast/long term correction data of the blocked satellites. Please note that, the above-mentioned manner of determining the additional GPS satellites is only one of examples in this present invention, and is not meant to be taken as a limitation. That is, other embodiments of this present invention utilizing different manners for choosing the additional GPS satellites are also possible. For example, according to its position and velocity information, the GPS receiver 200 can predict the GPS satellites that are going to be visible and can store the fast/long-term correction data corresponding to these predicted GPS satellites in advance.

Figure 4:
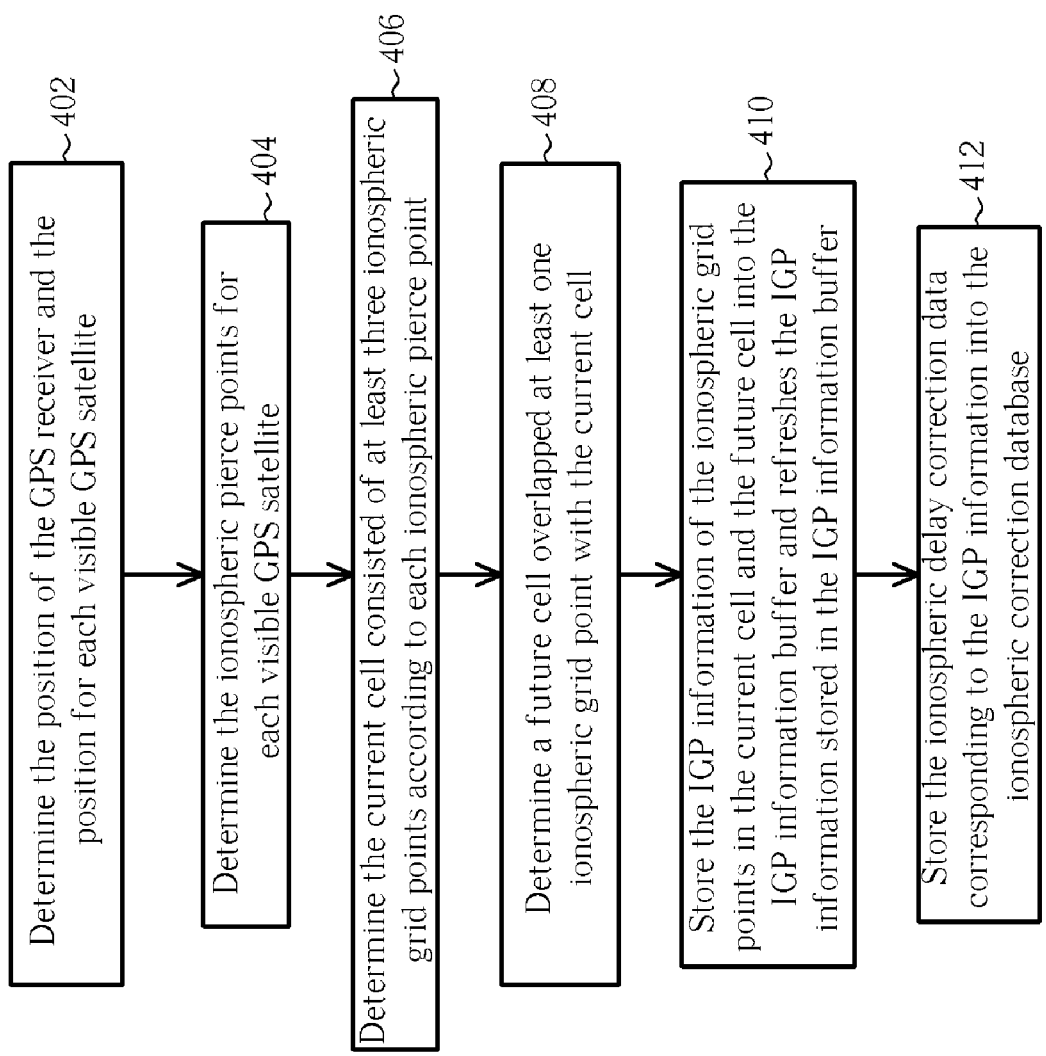
FIG. 4 is a flowchart illustrating the detailed operation for storing ionospheric delay correction data according to a second data storing method of the present invention.

Please refer to FIG. 2 in conjunction with FIG. 4. FIG. 4 is a flowchart illustrating the detailed operation for storing the ionospheric delay correction data according to a second data storing method of the present invention. As illustrated in FIG. 2, the WAAS correction database 240 includes a fast/long-term correction database 242 and an ionospheric correction database 244. It should be noted that the steps of the flowchart in FIG. 4 need not be in the exact order shown if the achieved result is substantially the same. The flowchart contains following steps:

Step 402: The GPS receiver 200 determines its position and the position for each visible GPS satellite.

Step 404: The navigation processor 250 determines the ionospheric pierce points (IPP) for each visible GPS satellite.

Step 406: The navigation processor 250 determines the current cell consisted of at least three ionospheric grid points according to each ionospheric pierce point.

Step 408: The navigation processor 250 determines a future cell overlapped at lest one ionospheric grid point with the current cell according to the movement of each ionospheric pierce point.

Step 410: The navigation processor 250 stores the IGP information of the ionospheric grid points in the current cell and the future cell into the IGP information buffer 260 and refreshes the IGP information stored in the IGP information buffer 260.

Step 412: The base-band processor 220 stores the ionospheric delay correction data corresponding to the IGP information into the ionospheric correction database 244.

Figure 5:
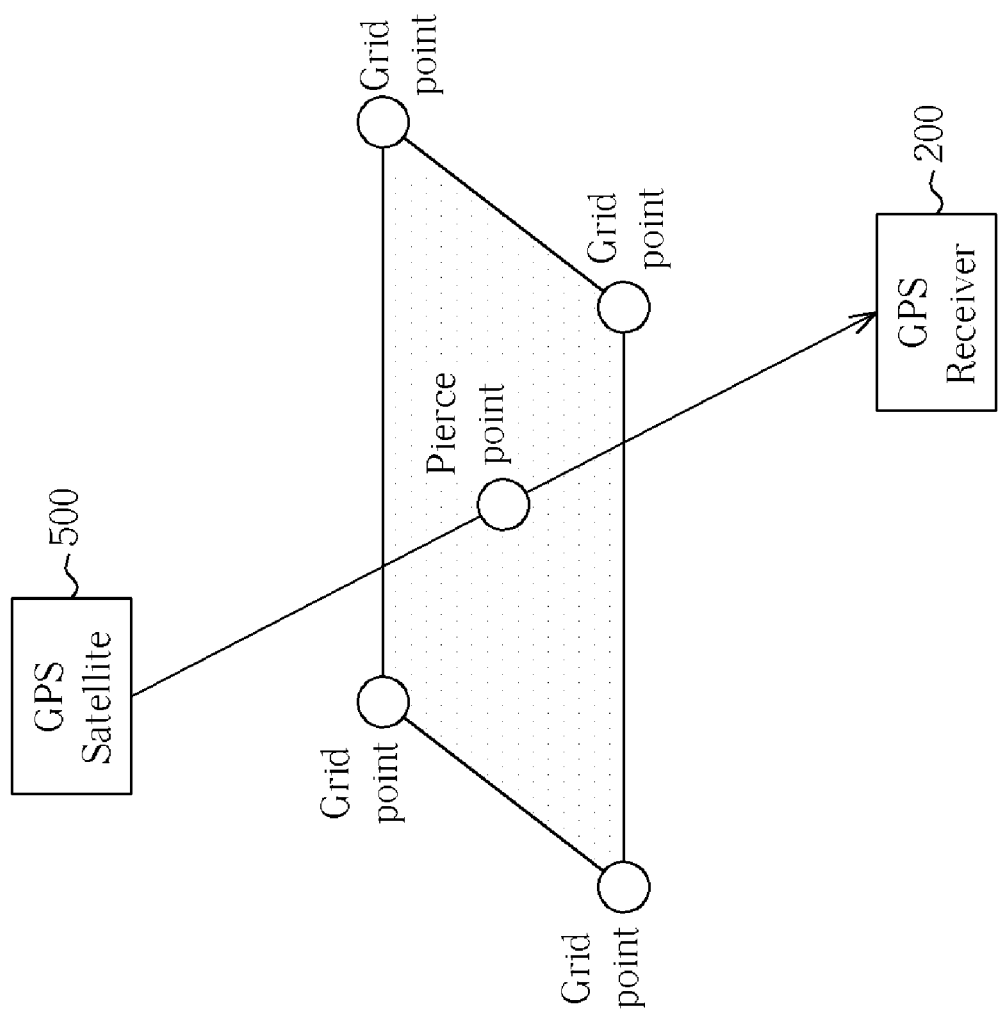
FIG. 5 is a schematic diagram illustrating the ionospheric pierce points determined by a navigation processor shown in FIG. 2.
Figure 6:
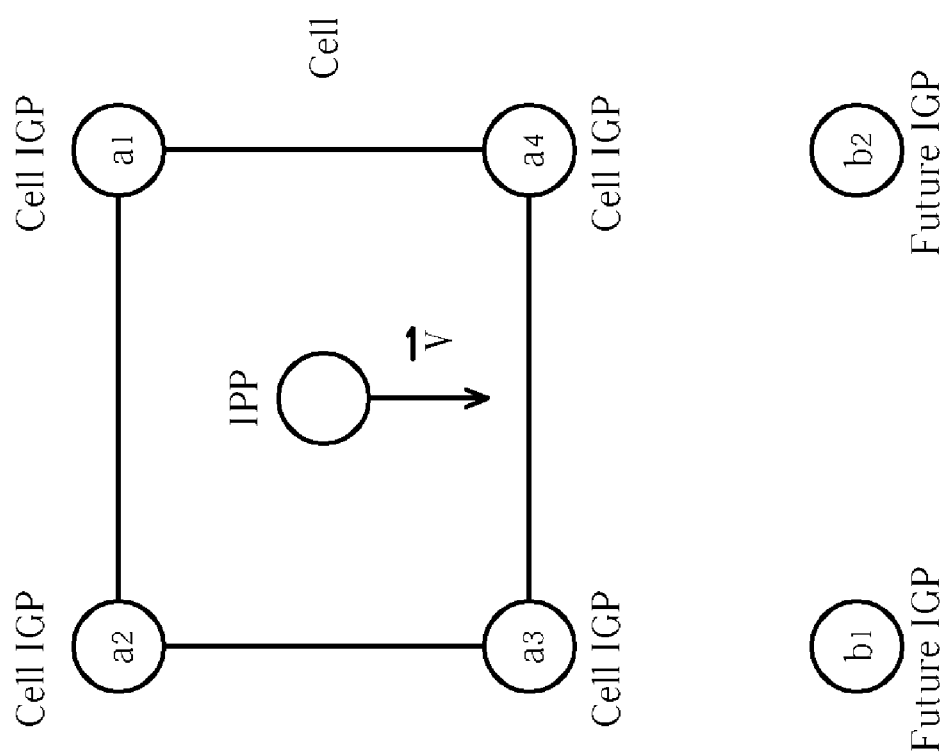
FIG. 6 is a schematic diagram illustrating possible ionospheric grid points related to each ionospheric grid point.

As shown in FIG. 4, the GPS receiver 200 first determines its own position and the position for each visible GPS satellite according to the ephemeris or almanac information of the visible satellites stored in the GPS database 230 (Step 402). Next, given the position information of the GPS receiver 200 and the visible satellites, the navigation processor 250 can determine the ionospheric pierce points (IPPs) for each visible GPS satellite (step 404). Please refer to FIG. 5. FIG. 5 is a schematic diagram illustrating the ionospheric pierce points determined by the navigation processor 250 shown in FIG. 2. The navigation processor 250 of the GPS receiver 200 is capable of computing the latitude and longitude of the IPP according to the azimuth and elevation angles of the visible satellite 500. The navigation processor 250 then determines the cell IGPs according to the position of each IPP (step 406). Please refer to FIG. 6. FIG. 6 is a schematic diagram illustrating possible ionospheric grid points related to each ionospheric pierce point. In this embodiment, the IPP is located in a cell area which is composed of four nearby cell IGPs (e.g. a1, a2, a3, and a4 shown in FIG. 6). Please note that, the second data storing method of the present invention is not limited to the number of cell IGPs composing the area in which the IPP is located. That is, in other embodiments of the present invention the GPS receiver also can determine three cell IGPs that compose a triangle area in which the IPP is located.

After determining the cell IGPs configuration corresponding to the IPP location, the navigation processor 250 determines the additional future ionospheric grid points according to the movement of each IPP (step 408). In general, the IPP continues moving due to the motion of the visible GPS satellite and the GPS receiver 200. Thus, the navigation processor 250 calculates the IPP's velocity (based on the IPP trajectory) and predicts the future cell area that the IPP is moving towards. Since the current and future cell areas, which are adjacent in space to each other, share two common IGPs, the GPS receiver 200 only needs to determine the other two future IGPs (e.g. b1 and b2 shown in FIG. 6) in the future cell. In summary, the navigation processor 250 only requires to determine a total of six IGPs (four current cell IGPs and two future IGPs) for each IPP corresponding to each GPS satellite. Moreover, an IGP may simultaneously be used by more than one GPS satellite. That is, the total number of IGPs that are determined by the navigation processor 250 for all visible GPS satellites may be less than a multiple of 6 times the total number of the visible satellites. For example, the maximum possible number of visible satellites for any location around the surface of the earth is about half the size of GPS constellation. Suppose the size of GPS constellation is 32, then the maximum total number of the IGPs required for a GPS receiver may be less than (32/2)*6=96, which is very less than the size of the original defined IGPs (1808 ). Again, the second storing method of the present invention is not limited to the number of future IGPs. In other embodiments of the present invention, the GPS receiver also can determine either one or more than two future IGPs depending on the design requirements.

After determining both cell IGPs and future IGPs, the navigation processor 250 stores the IGP information of both cell IGPs and future IGPs into the IGP information buffer 260, as shown in FIG. 2. The IGP information of each ionospheric grid point comprises of basic data, such as the Band and IGP number of the ionospheric grid point. The size of the IGP information buffer is also up to the maximum number of required IGPs (96 in above example). The navigation processor 250 then refreshes the outdated IGP information stored in the IGP information buffer 260 (step 410). Please note that there are a variety of ways to refresh the IGP information. One manner is to set a reference number for the each IGP information in the IGP information buffer. Reference number of an IGP indicates that there will be how many visible GPS satellites use the IGP delay data. When an IGP appears in the cell IGPs or future IGPs of a visible GPS satellite, the navigation processor 250 can then increment the reference number of the IGP information. A reference number larger than zero means that the corresponding IGP delay data is required in the following correction process and needs to be stored in the ionospheric correction database 244. Moreover, since there may be some IGPs shared by more than one visible GPS satellite, there will have some free slots in the IGP information buffer 260. These free slots can be further used by the navigation processor 250 for other purposes.

Next, the navigation processor 260 stores the ionospheric delay correction data corresponding to the IGP information stored in the IGP information buffer 260 into the ionospheric correction database 244. Typically, each IGP correction message (type 26) broadcasted from the WAAS satellite contains up to 15 IGP correction delay data sets. After the antenna module 210 receives the correction messages from the WAAS satellite, the navigation processor 250 checks if the bank and IGP number of the ionospheric delay correction data match the IGP information of the cell and future IGPs stored in the IGP information buffer 260. If it does match, the navigation processor 250 stores the ionospheric delay correction data corresponding to the cell and future IGPs into the ionospheric correction database 244. Otherwise, the navigation processor 250 discards the ionospheric delay correction data (step 412). After storing the ionospheric delay correction data of the IGPs corresponding to a visible GPS satellite, the navigation processor 250 is capable of calculating the IPP vertical delay according to the ionospheric delay correction data. Typically, the IPP vertical delay is available when at least three ionospheric delay correction data sets out of the four cell IGPs have been received. A 2-D differential positional solution can be constructed if the GPS receiver 200 has collected enough ionospheric delay correction data for three GPS satellites. If the GPS receiver 200 has collected the ionospheric delay correction data for more than three GPS satellites, a 3-D differential positional solution can be constructed accordingly.

To summarize, the GPS receiver 200 of the present invention not only stores the fast/long term correction data for additional GPS satellite in advance, but also stores the ionospheric correction delay data of the IGPs corresponding to future cell movements of the IPP. This greatly improves efficiency of the GPS receiver 200 as no additional time is wasted in waiting for fast/long term correction data of newly tracked GPS satellites. Also, the previously stored ionospheric correction delay data of the future cell IGPs make the GPS receiver 200 be able to proceed with proper correction calculation continuously for the visible satellites that are moving from the current cell to the future one. Moreover, in contrast to the related art of storing the WAAS correction data in the GPS receiver, the storing method of this present invention greatly reduces the required memory capacity for buffering the WAAS correction database 240. For example, since the GPS receiver only stores the fast/long term correction data for those satellites that are very possible to be visible, the number of slots in the fast/long term correction database is about half the size of GPS constellation, that is 32/2=16. Also, the number of slots in the ionospheric correction database that are required for storing the ionospheric correction delay data is 96. In sum, only around one hundred slots in the WAAS database 240 need to be created for storing the overall WAAS correction data. Therefore, the storing method of the present invention improves the efficiency, reliability and feasibility of a GPS receiver in applying WAAS corrections to achieve differential position solution and reduces the necessity for additional memory implemented in a GPS receiver.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method applied in a Global Navigation Satellite System (GNSS) for minimizing storage of correction data, comprising:
   determining a receiver position and at least a satellite position;
   determining an intermediate point between the satellite position and the receiver according to the receiver position and the satellite position, the intermediate point being located at an elevation between an elevation of the receiver position and an elevation of the satellite position, and a position of the intermediate point changing when either the receiver position changes or when the satellite position changes;
   determining a current cell of the intermediate point that is defined around the intermediate point according to the position of the intermediate point; and
   storing the correction data sets related to the current cell.

2. The method of claim 1, wherein the satellite position corresponds to a visible satellite.

3. The method of claim 1, wherein the intermediate point is in a predetermined atmospheric layer.

4. The method of claim 3, wherein the intermediate point is in the ionosphere.

5. The method of claim 1, wherein the current cell consists of at least three ionospheric grid points (IGP), and the IGPs surround the intermediate point.

6. The method of claim 1, further comprising the following steps:
   determining a future cell; and
   storing a plurality of correction data sets related to the future cell.

7. The method of claim 6, wherein the step of determining a future cell further comprises:
   determining the future cell according to the intermediate point and a motivation of the intermediate point.

8. The method of claim 6, wherein the current cell consists of at least three ionospheric grid points (IGP) which surround the intermediate point, and the future cell also consists of at least three IGPs which overlap at least one IGP with the current cell.

9. The method of claim 8, wherein the GNSS receiver further comprises an IGP pool for recording the IGP information to collect the IGP delay data, the method further comprises:
   refreshing the IGP information in the IGP pool according to the IGPs of the current cell and the future cell.

10. The method of claim 9, further comprising the following steps:
   for each IGP delay data, checking whether the corresponding IGP information exists in the IGP pool;
   if yes, storing the correction data related to the IGP into the IGP pool; and
   if no, checking whether the IGP pool is available for storing more IGP information;
   if yes, storing the correction data related to the IGP; and
   if no, discarding the data.

11. The method of claim 10, further comprising the following step:
   correcting the receiver position according to the correction data in the IGP pool.

12. The method of claim 6, wherein the motivation of the intermediate point is a velocity vector of the intermediate point.

13. The method of claim 6, wherein the motivation of the intermediate point is a locus of the intermediate point.

14. A computer-readable medium comprising computer-executable instructions for implementing the method as claim in claim 1.

15. A portable device, comprising a processor and a memory, adapted to implement the method as claimed in claim 1.

16. A method applied in a Global Navigation Satellite System for minimizing storage of correction data, comprising:
   determining position of a receiver and position of at least one satellite visible to the receiver;

determining an ionospheric pierce point between the receiver and each satellite, respectively, each ionospheric pierce point being located at an elevation between an elevation of the receiver and an elevation of a corresponding satellite, and a position of the ionospheric pierce point changing when either the position of the receiver changes or when the position of the corresponding satellite changes;

selecting a predetermined number of ionospheric grid points related to each ionospheric pierce point; and storing the correction data sets related to the selected ionospheric grid points.

17. The method of claim 16 further comprising determining future ionospheric grid points according to movement of each ionospheric pierce point.

* * * * *

UNITED STATES PATENT AND TRADEMARK OFFICE
CERTIFICATE OF CORRECTION

PATENT NO. : 7,629,923 B2  Page 1 of 1
APPLICATION NO. : 11/308244
DATED : December 8, 2009
INVENTOR(S) : Kung-Shuan Huang It is certified that error appears in the above-identified patent and that said Letters Patent is hereby corrected as shown below:

On the title page, item (73), correct the name of the assignee from "Media Tek Inc." to "MediaTek Inc."

Signed and Sealed this

Ninth Day of February, 2010

David J. Kappos
*Director of the United States Patent and Trademark Office*